J. N. KEYSER.
AUTOMOBILE SIGNAL.
APPLICATION FILED MAR. 1, 1919.

1,331,344.

Patented Feb. 17, 1920.
4 SHEETS—SHEET 1.

Inventor
John N. Keyser

By A. B. Foster
Attorney

J. N. KEYSER.
AUTOMOBILE SIGNAL.
APPLICATION FILED MAR. 1, 1919.
1,331,344.
Patented Feb. 17, 1920.
4 SHEETS—SHEET 2.
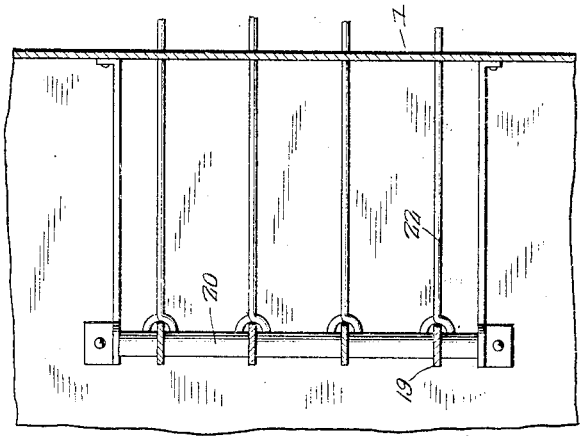
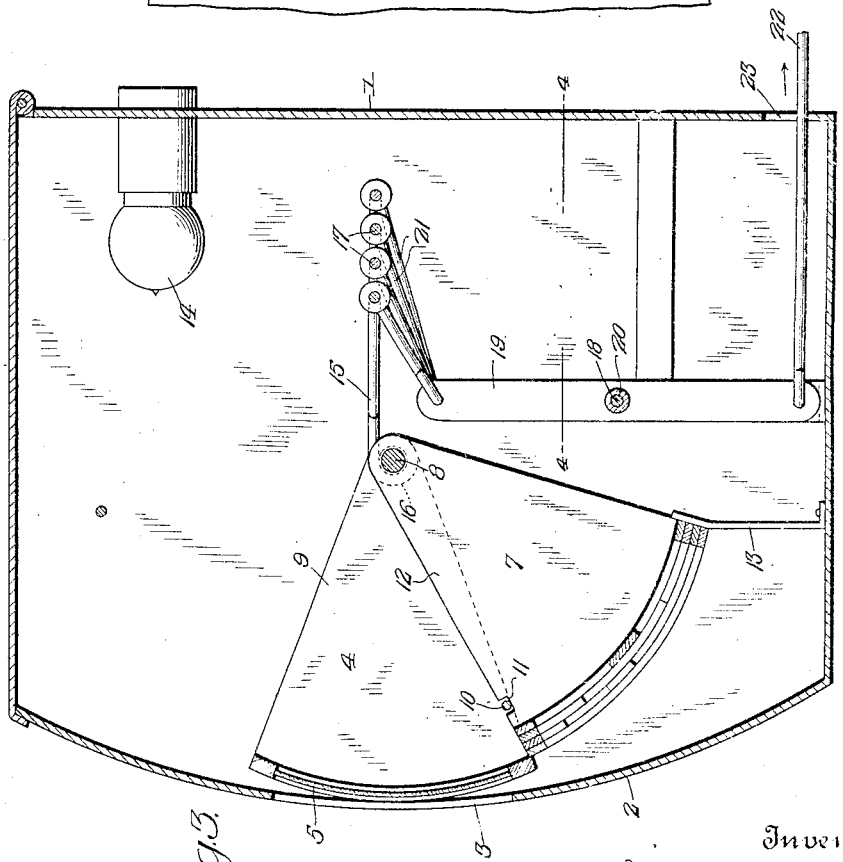
Inventor
John N. Keyser
By
A. B. Foster Attorney

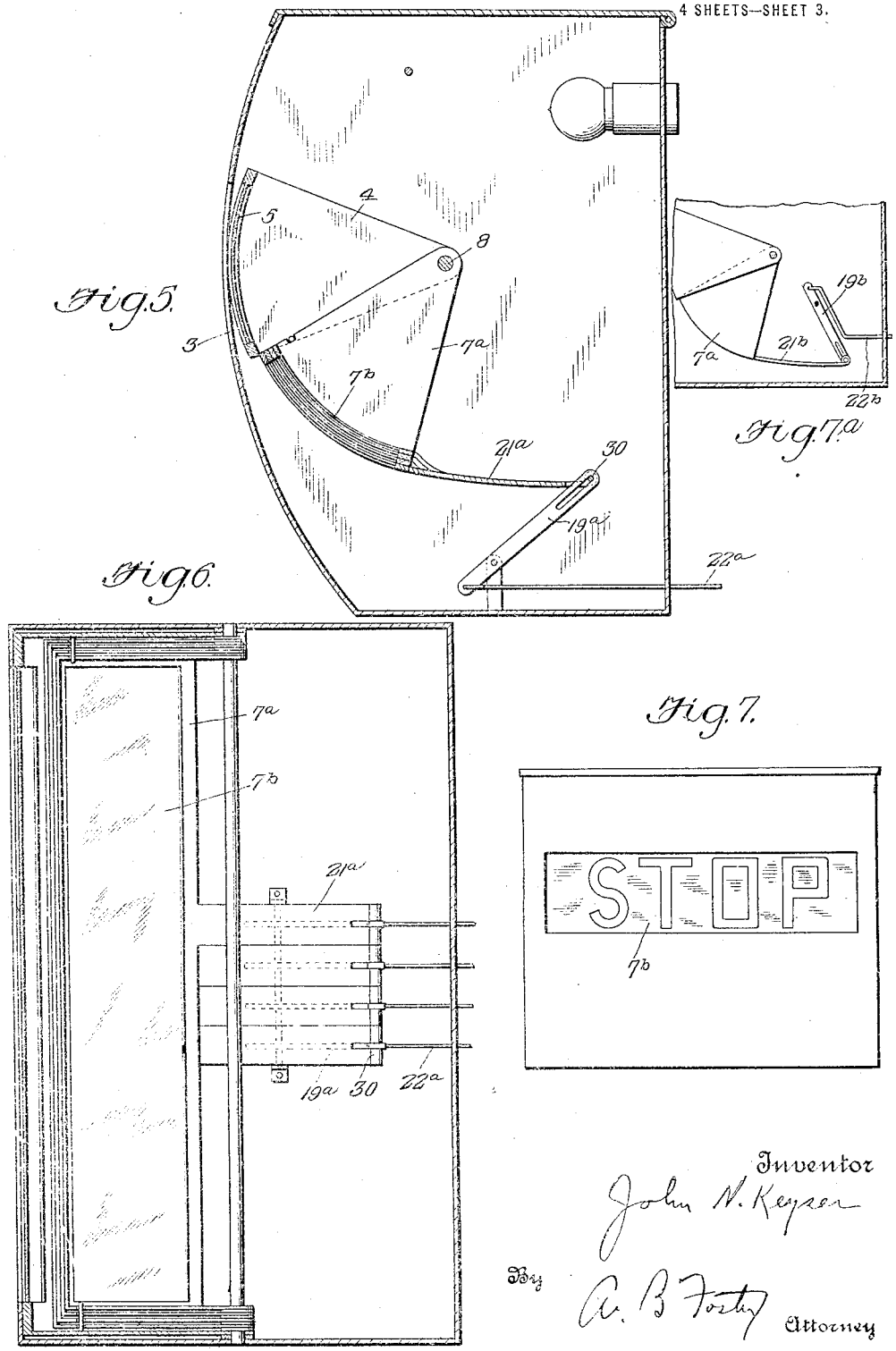

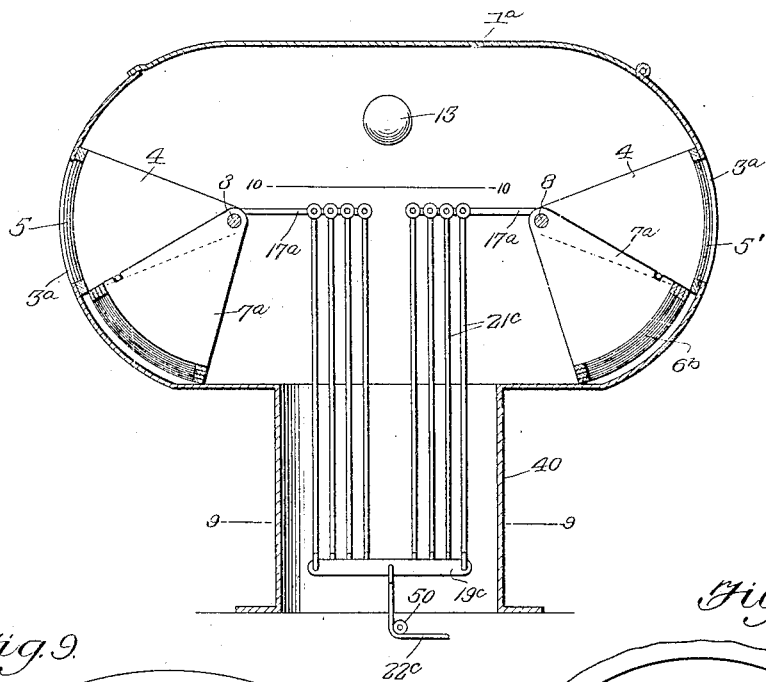
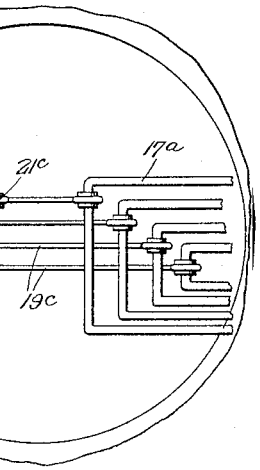
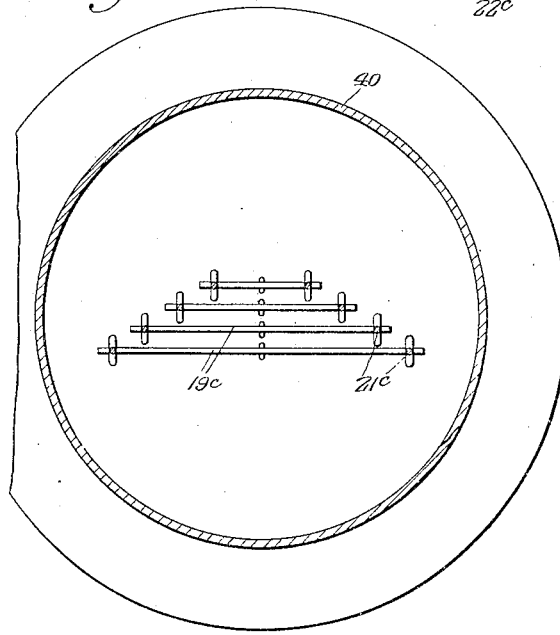

UNITED STATES PATENT OFFICE.

JOHN N. KEYSER, OF WASHINGTON, DISTRICT OF COLUMBIA.

AUTOMOBILE-SIGNAL.

1,331,344.  Specification of Letters Patent.  Patented Feb. 17, 1920.

Application filed March 1, 1919. Serial No. 280,116.

*To all whom it may concern:*

Be it known that I, JOHN N. KEYSER, a citizen of the United States, residing at Washington, District of Columbia, have invented certain new and useful Improvements in Automobile-Signals, of which the following is a specification.

The object of my present invention is the provision of an automobile signal that is by virtue of the relative arrangement of its elements exceedingly compact and yet is possessed of the capacity of showing a number of signals of individual purport at the will of the operator.

Being compact in construction and susceptible of being made in various ornamental forms, my novel signal is calculated to enhance rather than detract from the finished appearance of the automobile to which it is applied.

With the foregoing in mind, the invention in all of its details will be fully understood from the following description and claims when the same are read in connection with the drawings, accompanying and forming part of this specification, in which:

Fig. 3 is a vertical transverse section of the same.

Fig. 4 is a fragmentary horizontal section of the same, taken in the plane of the line 4—4 in Fig. 3.

Fig. 5 is a vertical section, and Fig. 6, a horizontal section of a modification.

Fig. 7 is an elevation of the same on a reduced scale.

Figures 1, 2:
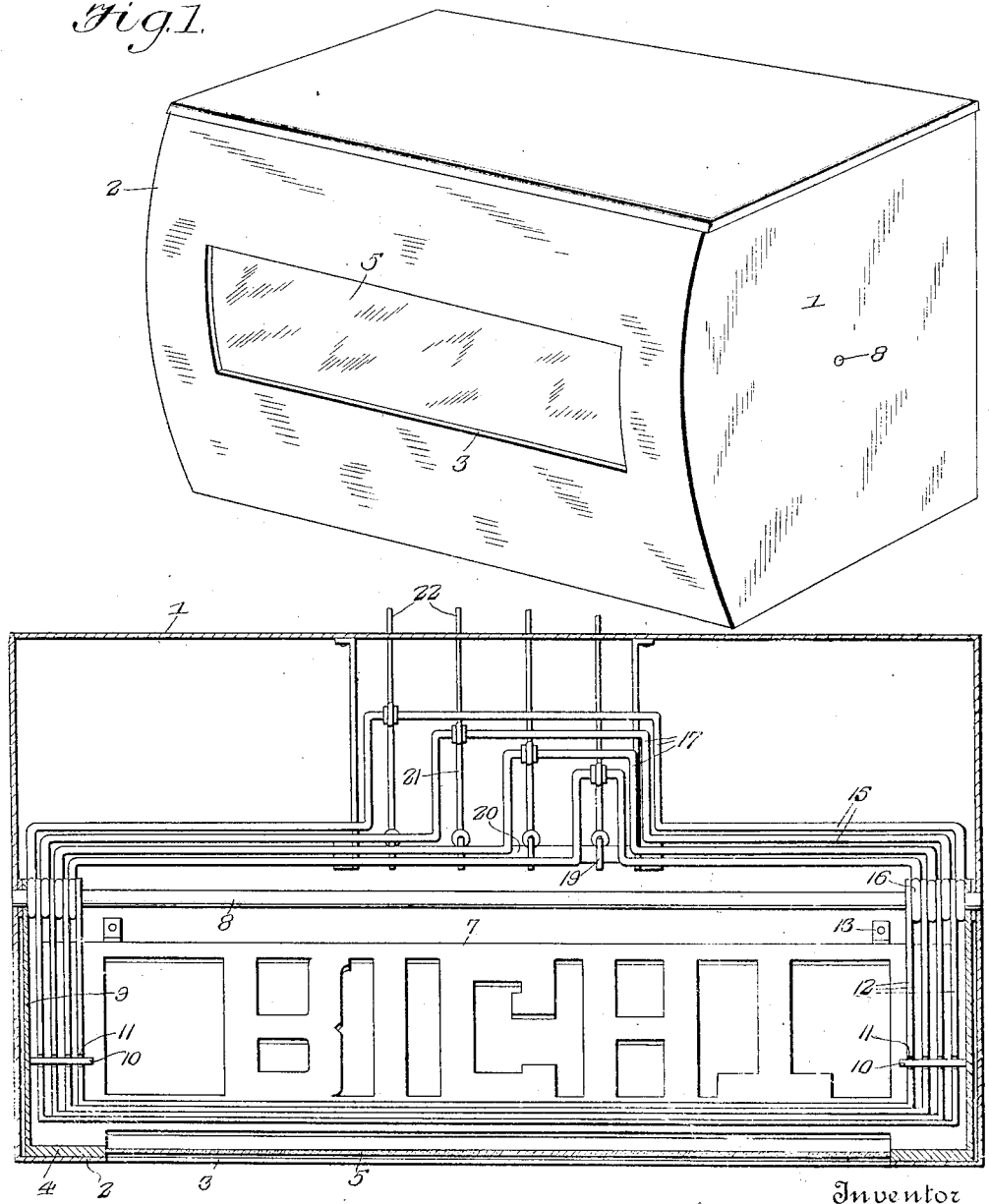
Figure 1 is a perspective showing the exterior of one practical embodiment of my invention.
Fig. 2 is a horizontal section showing the interior of the said embodiment and the working parts thereof.

Fig. 7ª is a detail view of a slight modification.

Fig. 8 is a vertical longitudinal section of a duplex signal constructed in accordance with the invention.

Fig. 9 is an enlarged horizontal section taken in the plane indicated by the line 9—9 of Fig. 8, looking downwardly.

Fig. 10 is a horizontal section, on an enlarged scale, taken in the plane indicated by the line 10—10 of Fig. 8, looking downwardly.

Reference as to details will first be had to Figs. 1 to 4 in which similar numerals designate corresponding parts.

The casing 1 of the signal is preferably, though not necessarily, of sheet metal, and is provided in its wall 2 with an opening 3 for the display of signals. When deemed expedient the said opening 3 may be occupied by a pane of glass or other transparent material with a view to excluding dust and dirt from the interior of the casing. This, however, is not of the essence of my invention, and I have therefore regarded it as unnecessary to illustrate the same.

My invention has for one salient feature, the combination with a movable member 4 carrying a pane 5 of transparent or translucent glass or other suitable material and mounted to be normally positioned with the pane 5 opposite the opening 3, of a plurality of sign or signal bearing members 7 constructed and arranged in such manner that the movement of any one of the same to position its sign or signal opposite the opening 3 will be attended by movement of the member 4 to carry its pane 5 out of alinement with the opening 3, while the return of the member 7 to its normal and idle position will be synchronous with the restoration of the member 4 to its normal position with its pane 5 opposite the opening 3. The invention has for a second important feature, the arrangement of the member 4 and the several members 7 in nested relation which is materially advantageous because it contributes to the compactness of the signal and at the same time renders the same strong and durable in construction and reliable in operation. It is also of the essence of my invention to so mount the members 4 and 7 that they have a common center of movement. To this end I provide the member 4 and each member 7 with end arms which are independently mounted to turn about a shaft 8, carried by the side walls of the casing 1. The end arms of the member 4 are numbered 9, and are equipped with inwardly directed, lateral projections or fingers 10. These fingers 10 are arranged to seat in notches 11 provided in the end arms 12 of the members 7. In consequence when any one of the members 7 is swung upwardly to position its sign opposite the opening 3, the member 4 will be raised by and before said member 7 to carry its pane 5 out of alinement with the opening 3. Again when said member is moved or permitted to gravitate back to its normal position, the member 4 by reason of gravity will follow the member 7 until the pane 5 of the member 4 is opposite the opening 3. At this point I would have it understood that the pane 5 is preferably red to serve as a danger signal, though it may be either red or white as conditions require. When in their lowermost and normal positions the members 7 bear, as shown, against stops 13 fixed to the casing 1 and rising from the bottom wall thereof. The intermediate portion of the member 4 preferably describes an arc of a circle vertically, and the same is true of the intermediate portions of the members 7. This provision manifestly contributes to the compact arrangement of the working parts. Moreover the intermediate portions of each member 7 is preferably of open-work construction, and the openings of each serve for the passage of rays of light from an electric or other suitable lamp 14, Fig. 3, and also serve to form a word of appropriate import. For instance, the intermediate portion of one member 7 will carry the word "Right" signifying the intention of the driver to turn to the right, another will bear the word "Left", another the word "Stop", and so on.

In Figs. 1 to 4 a certain specific and advantageous means is disclosed through which the members 7 are actuated. This means comprises a plurality of rock shafts 15 each of which is fixedly connected at its ends to the end arms 12 of one member 7 and each of which has its end portions 16 loose upon the shaft 8 and disposed to maintain the end arms 12 in spaced relation, Fig. 2. Each rock shaft 15 has a bail-shaped crank 17. These cranks 17 are of different sizes and are arranged in nested relation as illustrated. A suitably supported shaft 18 serves as a fulcrum for a plurality of independently-movable upright levers 19, Figs. 2–4, which are maintained in spaced relation thereon by sleeve sections 20. Intermediate the upper arms of the levers 19 and the bails 17 are links 21, best shown in Fig. 3, and connected to the lower arms of said levers 19 are rods 22 which are carried through an opening or openings 23 in one wall of the casing 1. Manifestly when the driver pulls upon any one of the rods 22 the member 7 connected with said rod will be swung upwardly independently of the other members 7; also, that when the rod 22 is released its member 7 will gravitate to its normal position or may be positively moved through the connected rod to such position. Thus the driver is enabled to quickly and easily display any one of the signals carried by the members 7 and retain such signal in exposed position as long as conditions require. Upon the return of each member 7 to its normal position the member 4 will gravitate to its normal position, Fig. 3, for the purpose of displaying the red or danger signal or the white light 5 as the case may be.

The embodiment illustrated in Figs. 5–7 differs from that shown in Figs. 1–4 in that its members $7^a$ are provided with panes $7^b$ of mica, glass or other transparent material upon which are individual signals such, for instance, as the word "Stop" shown in Fig. 7. The embodiment of Figs. 5 to 7 is also peculiar in that each of the members $7^a$ is provided on its intermediate portion with rearwardly reaching arms $21^a$, arranged in parallelism, Fig. 6. Each arm $21^a$ is connected at 30 with the upper slotted arm of a vertically swinging lever $19^a$ the lower arm of which is connected with a rod $22^a$ that extends through an opening in one wall of the casing 1. When any one of the rods $22^a$ is pulled rearwardly the member $7^a$ connected with said rod will be thrust upwardly to display its sign or signal through the opening 3 after it displaces or raises the member 4. Then when the rod $22^a$ is released, the member $7^a$ connected therewith, and the member 4 will gravitate to their normal positions.

It is entirely feasible as suggested in Fig. $7^a$ to connect the arms $21^b$ of the members $7^a$ to the lower arms of vertically swinging levers $19^b$ the upper arms of said levers $19^b$ being connected to operating rods or wires $22^b$ which are carried outside the casing 1.

In the duplex signal of Figs. 8 to 10, the casing $1^a$ is preferably shaped as shown with openings $3^a$ in its rounded end portions and is mounted on a hollow column 40 adapted to be mounted on any suitable part of an automobile so as to display one opening $3^a$ at the front and the other at the rear. Mounted in the casing $1^a$ and adjacent to each end thereof is a member 4 and a set of members $7^a$ similar to those disclosed in Fig. 5. I would here have it understood, however, that I prefer to equip the member 4 adjacent to the forward opening $3^a$ with a white pane $5'$ and the member 4 adjacent to the rear opening 3 with a red pane 5. Fixedly connected at their ends to the end arms of the members $7^a$ and loosely mounted on the shafts 8 are bail-shaped levers $17^a$ which are arranged in nested relation as shown in Fig. 10. Connected to and depending from the bights of the levers $17^a$ are rods $21^c$, and connected to the lower ends of the rods $21^c$ complementary to corresponding members $7^a$ at opposite ends of the casing $1^a$ are links $19^c$. For instance one link $19^c$ will be connected with the forward and rear members $7^a$ bearing the "Right" sign, another link $19^c$ will be connected to the forward and rear members $7^a$ bearing the "Left" sign, and so on. Each link $19^c$ is connected to an individual cable $22^c$ that is carried around a sheave 50 and to a suitable point of operation so as to enable the driver to conveniently and synchronously set the corresponding signals at the opposite ends of the casing 1ª.

It will be apparent from the foregoing that the salient features hereinbefore set forth are common to all of the several embodiments herein disclosed.

I have specifically described the embodiments shown in order to impart a full, clear and exact understanding of the same. It is to be understood, however, that I do not restrict myself to the specific constructions; the scope of my invention being defined by my appended claims.

Having described my invention, what I claim and desire to secure by Letters Patent, is:

1. An automobile signal comprising a casing for a wall provided with a transparent portion located in front of a display position for a sign-bearing member, means for illuminating the interior of the casing and the following instrumentalities located permanently within the said casing, namely:—a movable member that normally rests in display position, and a movable sign-bearing member which when moved to display position displaces the first-named member, and which in returning to its normal position permits the return to normal position of the first-named member.

2. An automobile signal comprising a casing for a wall provided with a transparent portion located in front of a display position for a sign-bearing member, means for illuminating the interior of the casing and the following instrumentalities located permanently within the said casing, namely:— a gravitating member that normally rests in display position, and a gravitating sign-bearing member which when raised to display position elevates the first-named member, and which in gravitating to its normal position permits of the gravitational return to normal position of the first-named member.

3. An automobile signal comprising a casing for a wall provided with a transparent portion located in front of a display position for a sign-bearing member, means for illuminating the interior of the casing and the following instrumentalities located permanently within the said casing, namely:— a movable member that normally rests in display position, and a plurality of independently-movable sign-bearing members any one of which when moved to display position displaces the first-named member, and which in returning to its normal position permits the return to normal position of the first-named member.

4. An automobile signal comprising a casing for a wall provided with a transparent portion located in front of a display position for a sign-bearing member, means for illuminating the interior of the casing and the following instrumentalities located permanently within the said casing, namely:— a gravitating member that normally rests in display position, and a plurality of independently-movable, gravitating sign-bearing members any one of which when moved to display position displaces the first-named member, and which in gravitating to its normal position permits of the gravitational return to normal position of the first-named member.

5. An automobile signal comprising a casing for a wall provided with a transparent portion located in front of a display position for a sign-bearing member, means for illuminating the interior of the casing and the following instrumentalities located permanently within the said casing, namely:— a movable member that normally rests in display position, and a plurality of independently - movable normally - nested sign-bearing members any one of which when moved to display position displaces the first-named member, and which in returning to its normal position permits the return to normal position of the first-named member.

6. An automobile signal comprising a casing for a wall provided with a transparent portion located in front of a display position for a sign-bearing member, means for illuminating the interior of the casing and the following instrumentalities located permanently within the said casing, namely:— a gravitating member that normally rests in display position, and a plurality of independently-movable, gravitating, normally-nested sign-bearing members any one of which when raised to display position elevates the first-named member, and which in gravitating to its normal position permits of the gravitational return to normal position of the first-named member.

7. An automobile signal comprising a casing for a wall provided with a transparent portion located in front of a display position for a sign-bearing member, means for illuminating the interior of the casing and the following instrumentalities located permanently within the said casing, namely:— a swinging member that normally rests in display position, and a swinging sign-bearing member which when swung to display position displaces the first-named member, and which in swinging back to its normal position permits the return to normal position of the first-named member.

8. In a signal, the combination of a swinging member that normally rests in display position and has an arm, and a plurality of independently swinging sign-bearing members each of which has an arm for coöperation with the arm of the first-named member, and any one of which when moved to display position thereby displaces the first-named member, and which in returning to its normal position permits the return to normal position of the first-named member.

9. In a signal, the combination of a swinging member that normally rests in display position and has an arm, and a projection on said arm, and a plurality of normally nested, independently-swinging sign-bearing members each of which has an arm to bear against said projection on the arm of the first-named member, and any one of which when moved to display position thereby displaces the first-named member and which in returning to its normal position permits the return to normal position of the first-named member.

10. In a signal, a casing having a display portion, a swinging member in the casing, that describes a part of a circle and normally rests in display position and has an arm on which is a projection, and a plurality of normally-nested, independently-swinging sign-bearing members, in the casing, each of which describes a part of a circle and has an arm to bear against said projection on the arm of the first-named member, and any one of which when moved to display position thereby displaces the first-named member, and which in returning to its normal position permits the return to normal position of the first-named member.

11. In a signal, a casing having a display portion, a swinging member in the casing, that describes a part of a circle and normally rests in display position and has an arm on which is a projection, and a plurality of normally-nested, independently-swinging sign-bearing members, in the casing, each of which describes a part of a circle and has an arm to bear against said projection on the arm of the first-named member, and any one of which when moved to display position thereby displaces the first-named member, and which in returning to its normal position permits the return to normal position of the first-named member, and individual operating connections through which the second-named members are moved.

12. The combination in a signal, of light-affording means, a member movable from and to a position for the display of the light, a movable sign-bearing member associated with the first-named member whereby movement of one member will attend movement of the other, and an operating connection through which one member may be moved.

13. In a signal, light-affording means associated with a member movable from and to a position for the display of the light, a plurality of sign-bearing members movable concentrically to each other and the first-named member and any one of which when moved in one direction moves the first-named member and when moved in the opposite direction permits of a corresponding movement of the first-named member, and individual operating connections through which the second-named members are independently movable.

14. In a signal, light-affording means associated with a plurality of concentrically and independently actuatable sign-bearing members having the capacity of displaying the light through their signs, and individual operating connections through which said members are independently actuatable.

In testimony whereof I affix my signature.

JOHN N. KEYSER.